United States Patent [19]

Powanda et al.

[11] 4,056,503
[45] Nov. 1, 1977

[54] INCORPORATION OF MULTIFUNCTIONAL MONOMERS (PETA, TMPTA, AND HDODA) IN VINYL-ACRYLIC EMULSION POLYMERS

[75] Inventors: Thomas M. Powanda, Middlesex; Ralph F. Patella, South Plainfield; Joseph A. Vona, Westfield; Charles A. DeFazio, Berkeley Heights, all of N.J.

[73] Assignee: Celanese Corporation, New York, N.Y.

[21] Appl. No.: 733,632

[22] Filed: Oct. 18, 1976

[51] Int. Cl.² ............................................. C08L 31/04
[52] U.S. Cl. .................... 260/29.6 T; 260/29.6 TA; 428/500; 526/320; 526/328
[58] Field of Search ............................. 526/320, 328; 260/29.6 T, 29.6 TA

[56] References Cited

U.S. PATENT DOCUMENTS

| | | | |
|---|---|---|---|
| 3,203,918 | 8/1965 | Goldberg, et al. | 526/320 |
| 3,755,237 | 8/1973 | Isaacs et al. | 526/320 |

*Primary Examiner*—Harry Wong, Jr.
*Attorney, Agent, or Firm*—John A. Shedden

[57] ABSTRACT

New emulsion polymers comprising vinyl acetate-acrylate or methacrylate emulsion polymer containing in the polymer an $\alpha,\beta$-ethylenically unsaturated acid ester of a polyol. For example, pentaerythritol tri- and tetraacrylate, trimethylolpropane triacrylate, hexanediol diacrylate, etc.

9 Claims, No Drawings

INCORPORATION OF MULTIFUNCTIONAL MONOMERS (PETA, TMPTA, AND HDODA) IN VINYL-ACRYLIC EMULSION POLYMERS

This invention relates to new and improved coating compositions and, more particularly to such compositions comprised of latex emulsion vinyl-acrylic polymers including certain multifunctional monomers.

Latex paints, especially for exterior use, have gained wide acceptance in recent years primarily because of their durability, ease of application and ease of clean-up using soap and water. However, the use of latex paints has always been attended by inherent drawbacks such as adhesion to chalky surfaces; wet adhesion in damp areas; and adhesion to metal substrates.

Commonly, latex paints are emulsions of polyvinyl acetate or vinyl acetate copolymers with comonomers such as acrylates, fumarates and the like in which vinyl acetate is the predominant monomer, and such emulsions suffer from the drawbacks previously mentioned, as well as the presence of grit produced during formation of the emulsion polymer, the difficulty of controlling viscosities of the copolymers in formation processes, and related problems.

The present invention provides new vinyl/acrylate copolymer coating compositions of improved properties over corresponding prior art compositions, particularly in providing coatings which show excellent weathering characteristics, even when applied to chalky surfaces, over long periods of exposure under standard testing procedures. In addition, this invention provides ease of controlling the viscosity of the latex composition; reduces the problem of grit content; provides a range of minimum film-forming temperatures of the product; and provides compositions which yield excellent crystal clear dried films which are characteristically of high water resistance and scrubbability.

The multifunctional monomers of the present new compositions are $\alpha,\beta$-ethylenically unsaturated carboxylic acid esters of polyols, the polyols containing at least two hydroxy groups. Exemplary of such acids are acrylic, methacrylic and homologous acids thereof, and the polyols include, for example, ethylene glycol; diethylene glycol; glycerol; 1,3-propanediol; 1,3-butanediol; 1,2,4-butanetriol; 1,4-cyclohexanediol; 1,4-benzenediol; pentaerythritol; dipentaerythritol; tripentaerythritol; trimethylolpropane; trimethylolethane; sorbitol; 1,5-pentanediol; hexanediol; polyethylene glycols (Mol. wt. = 200–1500) and the like.

Latex emulsion paints are generally comprised of two dispersions: first, dry powders including colorants, fillers and extenders and, second, a resin dispersion. The powder dispersion is prepared by milling the dry ingredients into water and it is then blended with the resin dispersion to produce the emulsion paint. Surfactants and protective colloids are introduced to the emulsion to stabilize the product. The paints are characterized by the binder being in a water-dispersed form whereas in a solvent paint it is in solution form. Due to these inherent differences, the formulation and handling of emulsion paints differ from conventional solvent paints.

The three principal latex paints in use are styrene-butadiene, vinyl acetate including vinyl acetate/acrylate, and acrylic polymers. Usually the dry powder ingredients are employed at a level of from about 25–30%; the latex, at about 40–50%; and water, at about 20–30%.

The present new emulsion polymers comprise a vinyl acetate-acrylate or methacrylate emulsion polymer containing, in the polymer, an $\alpha, \beta$-ethylenically unsaturated acid ester of a polyol. Thus, the present new emulsion polymers are terpolymers of vinyl acetate and acrylate, or methacrylate, esters in which the third monomer is an $\alpha, \beta$-ethylenically unsaturated acid ester of a polyol. The polymers should contain at least 2% of the third monomer, and preferably at least 4% based on the weight of terpolymer. The preferred emulsion polymers contain from about 2% to about 10%, and most preferably from about 4% to about 10%, of the third monomer.

The new coating compositions of this invention, especially paint compositions, comprise the aforesaid new emulsion polymers.

DESCRIPTION OF PREFERRED EMBODIMENTS

The preferred multifunctional polyol derivatives are acrylic acid or methacrylic acid esters of the selected polyol in which at least two hydroxy groups are esterified. Exemplary preferred compounds include: ethylene glycol diacrylate, diethylene glycol diacrylate, glycerol diacrylate, glycerol triacrylate, ethylene glycol dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tri- and tetra-acrylate and methacrylate, dipentaerythritol hexacrylate, tripentaerythritol hexacrylate, tripentaerythritol octaacrylate, trimethylolpropane triacrylate, trimethylolethane triacrylate, sorbitol hexacrylate, 1,3-propanediol diacrylate, 1,5-pentanediol dimethacrylate, hexanediol diacrylate, the bisacrylates and methacrylates of polyethylene glycols of a molecular weight of 200–1500, and the like, including mixtures in all proportions.

The multifunctional polyol derivatives can be employed at any level to attain the desired result. As little as 0.5% by weight based on the total weight of monomer mixture will provide some beneficial results. Generally, at least about 2% and up to about 10% can be employed for most compositions, although larger amounts can be employed. However, when high levels of the derivative are used, care should be taken to avoid gelation of the reaction mixture. A minimum of experimentation will dictate the optimum effective levels of the polyol derivative of any particular latex polymer preparation and is within the skill of the art. As is evident, the level at which gelation will occur is dependent upon the number of unsaturated acyl groups contained in the polyol derivative, as well as the process conditions employed in the preparation of the latex product.

The preferred emulsion polymers are comprised of vinyl acetate and an alkyl acrylate, or methacrylate, in addition to the aforesaid multifunctional polyol derivative. Generally, the amount of acrylate, or methacrylate, ester will range from about 5% to 50% by weight and preferably from about 10% to about 30% by weight based on the total weight of vinyl acetate and acrylate monomers. Exemplary acrylates include methyl acrylate, ethyl acrylate, 2-ethylhexyl acrylate, methyl methacrylate, ethyl methacrylate, n-propyl methacrylate, isobutyl acrylate and isobutyl methacrylate.

The procedures used to prepare the new polymer emulsions of this invention generally involve admixing under rapid stirring the monomer charge with water, surfactants or emulsifying agent, a polymerization catalyst or initiator, and, in most cases, a protective colloid-forming substance. The mixture is then heated to polymerization temperature for the time required to substantially complete the emulsion polymer formation. Many variations of the general preparative procedure are used to obtain, for example, lower viscosity, high solids content, improved freeze-thaw stability, etc. These variations include, for example, the use of a pre-emulsion technique (see U.S. Pat. No. 3,637,563) in which the monomer charge is first emulsified in water using a surfactant or emulsifying agent, and then the pre-emulsion is added to the reaction mixture which contains the remaining reactants; intermediate addition of surfactant to the polymerization reaction mixture during the polymerization (see U.S. Pat. No. 3,423,352); and addition of a water-soluble free radical initiator to a substantially a completely polymerized emulsion and reacting further to reduce the viscosity of the emulsion (see U.S. Pat. No. 3,423,353).

For the present new emulsion polymers, it is preferred to add the monomer mixture, including the multifunctional polyol derivative, to an aqueous surfactant-containing solution with adequate stirring to obtain a stable pre-emulsion which is then added to the polymerization reaction medium containing the catalyst and pre-heated to reaction temperature. The addition of the pre-emulsion of comonomers is regulated to allow control over the polymerization. In general, the rate of addition of the pre-emulsion is usually such that at least one hour and usually two hours and more are required for the total addition. In all cases, the rates of addition of reactants are controlled to permit regulation of the reaction temperature to below 100° C and preferably not higher than about 75° C. After the addition of monomer charge, it is usually preferred to add a minor amount of catalyst and continue heating the mixture to assure complete reaction of all monomers. This latter step is to avoid detectable monomer odor in the product when intended for coating uses.

The surfactants, or emulsifying agents employed can be any of the anionic, cationic or non-ionic materials, commonly employed, as well as mixtures thereof, provided that preferably, a predominant amount of surfactant, i.e. at least 50% based on total weight of surfactant used, and usually all of the surfactant, contains at least four ether linkages. The surfactants are normally employed at levels of from about 1% to about 10% of the weight of total monomers present.

A particularly preferred class of polyether surfactants or emulsifying agents encompasses ethylene oxide and propylene oxide condensates in general, e.g., straight and branched-chain alkyl and alkylaryl polyethylene glycol and polypropylene glycol ethers and thioethers and more particularly substances such as the "Igepals," which are members of a homologous series of alkl-phenoxypoly (ethyleneoxy) ethanols, which series can be represented by the general formula

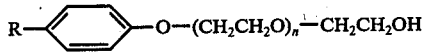

wherein R represents an alkyl radical and n represents the number of mols of ethylene oxide employed, included among which are alkylphenoxypoly (ethyleneoxy) ethanols having alkyl groups containing from about 7 to about 18 carbon atoms, inclusive, and having from about 4 to about 100 ethyleneoxy units, such as the heptylphenoxypoly (ethyleneoxy) ethanols, nonyl-phenoxypoly (ethyleneoxy) ethanols and dodecyl-phenoxypoly (ethyleneoxy) ethanols; the sodium, potassium or ammonium salts of the sulfate esters of these alkylphenoxypoly (ethyleneoxy) ethanols; alkylpoly (ethyleneoxy) ethanols; alkylpoly (propyleneoxy) ethanols; octylphenoxyethoxy ethyldimethylbenzylammonium chloride; polyethylene glycol t-dodecylthioether; the "Tweens," which are polyoxyalkylene derivatives of hexitol (including sorbitans, sorbides, mannitans and mannides) anhydride partial long-chain fatty acid esters, such as the polyoxyalkylene derivatives of sorbitan monolaurate, sorbitan monopalmitate, sorbitan monostearate, sorbitan tristearate, sorbitan monooleate and sorbitan trioleate, the "Pluronics," which are condensates of ethylene oxide with a hydrophobic base, formed by condensing propylene oxide with propylene glycol, and the like.

As previously indicated, a protective colloid-forming substance is generally employed, and will usually contain at least one ether linkage, and preferably a plurality thereof. Included among such ether linkage-containing materials are hydroxymethyl cellulose, hydroxyethyl cellulose, ethyl hydroxyethyl cellulose, ethoxylated starch derivatives, and the like. However, other protective colloid-forming substances, i.e., ones containing no ether linkages, can also be used either alone or together with said ether linkage-containing materials, and included among these are partially and fully hydrolyzed polyvinyl alchols, natural and synthetic gums, such as gum tragacanth and gum arabic, polyacrylic acid, poly (methyl vinyl ether/maleic anhydride), and the like. All of these materials will be used in the amounts found in conventional emulsion polymerization procedures (generally from about 0.1% to about 2% by weight, based on the total weight of the emulsion).

The emulsified monomer mixture is polymerized in the usual manner, i.e., by means of a catalytic amount of a conventional free radical polymerization catalyst or catalyst system (which can also be referred to as an addition polymerization catalyst, a vinyl polymerization catalyst or a polymerization initiator), with the proviso that the catalyst or catalyst system be substantially water soluble. An illustrative but by no means exhaustive enumeration of such catalysts includes inorganic peroxides such as hydrogen peroxide, sodium perchlorate and sodium perborate, inorganic persulfates such as sodium persulfate, potassium persulfate and ammonium persulfate, and redox systems such as sodium metabisulfite-potassium persulfate, and the like.

The particular catalyst or catalyst system employed initially can generally be used in amounts ranging from about 0.01% to about 3% by weight, based on the total weight of monomer present.

Coatings prepared with the present new emulsion polymers show excellent adhesion to substrate surfaces, including chalky wood surfaces, good water-spotting resistance and excellent scrubbability. Additionally, these coatings show excellent weather resistance using standard test procedures. Compared to emulsion polymers not containing a multifunctional monomer but otherwise the same, the present new polymers are higher in tensile strength and of comparable scrubbability, hardness and clarity. In the present new emulsions, it has been found that the minimum film-forming temperature can be varied over a wide range by varying the amount and type of multifunctional monomer present in the polymer.

The molecular weights of the present new emulsion polymers are higher than otherwise identical polymers without the multifunctional monomer present which makes these new polymers more satisfactory for coatings applications.

The lower viscosities of the present new emulsion polymers make it possible to obtain high solids content. This is particularly advantageous since the use of sophisticated equipment and/or techniques normally required for high solids content emulsions can be alleviated in the processing of the emulsions into commercial coating products.

Especially preferred coatings based on the present new emulsion polymers are paints. The paint formulations are prepared using standard formulations well known in the art, as exemplified hereinafter. On testing the paint formulations using standard test procedures for determining weather resistance, the present new emulsion polymers show substantial improvement over controls and, even more importantly, compare extremely favorably with paint formulations based on 100% acrylic emulsions. Unexpectedly, the present formulations show at least comparable resistance and in most cases better resistance to weathering than comparable all-acrylic emulsion paints.

The following Examples are provided to further illustrate the invention.

EXAMPLE 1

A series of latex paint polymers are prepared using the following procedure:
1. Prepare a solution of Igepal CA-897 and Triton X-200 in 100-ml of the total water in a 1000-ml. beaker using adequate agitation.
2. Pour 268.37 g of water and 2.0 g of Natrosol 180 LR into a 2000-ml. four-neck reaction flask. Heat for ½ hour at 65° C by means of an external water bath.
3. Prepare a mixture of the vinyl acetate, butyl acrylate, multifunctional monomer, and tertiary butyl hydroperoxide in a suitable container. Stir well with spatula for adequate blending.
4. Pour the monomer blend slowly into the solution prepared in Step 1 (with adequate agitation) to obtain a stable pre-emulsion. Place the pre-emulsion in a 1000-ml. graduated dropping funnel and hold for delayed addition to the reactor.
5. Dissolve the Hyrozin in 58 ml. of water. Hold for delayed addition.
6. Dissolve 0.05 g. sodium persulfate in 10 cc of water. Hold for initial addition.
7. When the contents of the reaction flask (Step 2) have been heated to 65° C for ½ hour, add to the flask the sodium persulfate solution and 8 cc of the Hydrozin solution. Stir for 5 minutes.
8. Start the addition of the pre-emulsion. Polymerization should occur at once as evidenced by the blue color of the contents in the reaction flask.
9. Schedule the pre-emulsion for a 150 minute addition period.
10. Start the addition of the Hydrozin solution and schedule for 2 hours and 40 minutes.
11. Do not allow the reaction temperature to exceed 70°–71° C.
12. At the completion of the pre-emulsion and Hydrozin feeds, allow the reaction temperature to dissipate until it equals the water bath temperature.
13. Hold for 1 hour at 65° C and then cool to room temperature.

The Inherent Viscosity is determined at 25° C by establishing a 0.2% solids solution in 80% acetic acid.

The Thixotropic Index is determined on a Brookfield Viscometer by taking the largest spindle which will give a reading on the scale at 200 rpm and recording the viscosity at 20, 40, 100 and 200 rpm; starting at the lowest and going to the highest speed.

The results are given in Table I.

Table 1

| | SAMPLE | | | | |
|---|---|---|---|---|---|
| | (Control) | 1 | 2 | 3 | 4 |
| FORMULATION | | | | | |
| Vinyl Acetate | 450.50 | 432.48 | 414.46 | 432.38 | 414.46 |
| Butyl Acrylate | 79.50 | 76.32 | 73.14 | 76.32 | 73.14 |
| Pentaerythritol Triacrylate | — | 21.20 | 42.40 | — | — |
| Hexanediol Diacrylate | — | — | — | 21.20 | 42.40 |
| Igepal CA-897 | 27.00 | 27.00 | 27.00 | 27.00 | 27.00 |
| Triton X-200 | 3.00 | 3.00 | 3.00 | 3.00 | 3.00 |
| Tertiary Butyl Hydroperoxide (90%) | 0.90 | 0.90 | 0.90 | 0.90 | 0.90 |
| Sodium Persulfate | 0.05 | 0.05 | 0.05 | 0.05 | 0.05 |
| Hydrozin | 0.68 | 0.68 | 0.68 | 0.68 | 0.68 |
| Natrosol 180 LR | 2.00 | 2.00 | 2.00 | 2.00 | 2.00 |
| Total Water | 436.37 | 436.37 | 436.37 | 436.37 | 436.37 |
| PROPERTIES | | | | | |
| Viscosity | 2025 | 1975 | 1450 | 1800 | 2000 |
| % Solids | 53.0 | 53.5 | 53.8 | 54.0 | 53.5 |
| pH | 4.0 | 4.2 | 4.0 | 4.1 | 3.9 |
| Grit (ppm) | 219 | — | 187 | — | 153 |
| MFFT, ° F | 60 | 68 | 92 | 65 | 73 |
| T.I. | 0.39 | 180 0.39 | 0.43 | 0.42 | 0.37 |
| I.V. | 0.60 | 0.91 | 1.05 | 1.09 | 0.87 |

| | 5 | 6 | 7 | 8 |
|---|---|---|---|---|
| FORMULATION | | | | |
| Vinyl Acetate | 432.48 | 414.46 | 432.48 | 414.46 |
| Butyl Acrylate | 76.32 | 73.14 | 76.32 | 73.14 |
| Trimethylolpropane Triacrylate | 21.20 | 42.40 | — | — |
| PETA/HDODA (50/50) | — | — | 21.20 | 42.40 |
| Igepal CA-897 | 27.00 | 27.00 | 27.00 | 27.00 |
| Triton X-200 | 3.00 | 3.00 | 3.00 | 3.00 |
| Tertiary Butyl Hydroperoxide (90%) | 0.90 | 0.90 | 0.90 | 0.90 |
| Sodium Persulfate | 0.05 | 0.05 | 0.05 | 0.05 |
| Hydrozin | 0.68 | 0.68 | 0.68 | 0.68 |

Table 1-continued

| | SAMPLE | | | |
|---|---|---|---|---|
| Natrosol 180 LR | 2.00 | 2.00 | 2.00 | 2.00 |
| Total Water | 436.37 | 436.37 | 436.37 | 436.37 |
| PROPERTIES | | | | |
| Viscosity (cps) | 1800 | 1800 | 2050 | 1600 |
| % Solids | 53.9 | 54.4 | 54.5 | 54.1 |
| pH | 3.9 | 4.0 | 4.0 | 4.1 |
| Grit (ppm) | Not run | 158 | Not run | Not run |
| MFFT, °F | 68 | 84 | 68 | 78 |
| T.I. | 0.37 | 0.43 | 0.44 | 0.47 |
| I.V. | 0.83 | 1.24 | 0.82 | 1.14 |
| | 9 | 10 | 11 | 12 |
| FORMULATION | | | | |
| Vinyl Acetate | 432.48 | 414.46 | 432.48 | 414.46 |
| Butyl Acrylate | 76.32 | 73.14 | 76.32 | 73.14 |
| TMPTA/PETA (50/50) | 21.20 | 42.40 | — | — |
| TMPTA/HDODA (50/50) | — | — | 21.20 | 42.40 |
| Igepal CA-897 | 27.00 | 27.00 | 27.00 | 27.00 |
| Triton X-200 | 3.00 | 3.00 | 3.00 | 3.00 |
| Tertiary Butyl Hydroperoxide (90%) | 0.90 | 0.90 | 0.90 | 0.90 |
| Sodium Persulfate | 0.05 | 0.05 | 0.05 | 0.05 |
| Hydrozin | 0.68 | 0.68 | 0.68 | 0.68 |
| Natrosol 180 LR | 2.00 | 2.00 | 2.00 | 2.00 |
| Total Water | 436.37 | 436.37 | 436.37 | 436.37 |
| PROPERTIES | | | | |
| Viscosity (cps) | 2375 | 1525 | 2075 | 1700 |
| % Solids | 54.2 | 53.0 | 53.8 | 53.3 |
| pH | 4.2 | 4.0 | 4.1 | 3.9 |
| Grit (ppm) | Not run | Not run | Not run | Not run |
| MFFT, °F | 69 | 92 | 65 | 78 |
| T.I. | 0.45 | 0.42 | 0.45 | 0.47 |
| I.V. | 0.96 | 1.08 | 0.94 | 0.82 |
| | 13 | 14 | 15 | |
| FORMULATION (70/30) | | | | |
| Vinyl Acetate | 341.32 | 341.32 | 341.32 | |
| Butyl Acrylate | 146.28 | 146.28 | 146.28 | |
| Pentaerythritol Triacrylate | 42.40 | — | — | |
| Hexanediol Diacrylate | — | — | 42.40 | |
| Trimethylolpropane Triacrylate | — | 42.40 | — | |
| Igepal CA-897 | 27.00 | 27.00 | 27.00 | |
| Triton X-200 | 3.00 | 3.00 | 3.00 | |
| Tertiary Butyl Hydroperoxide (90%) | 0.90 | 0.90 | 0.90 | |
| Sodium Persulfate | 0.05 | 0.05 | 0.05 | |
| Hydrozin | 0.68 | 0.68 | 0.68 | |
| Natrosl 180 LR | 2.00 | 2.00 | 2.00 | |
| Total Water | 436.37 | 436.37 | 436.37 | |
| PROPERTIES | | | | |
| Viscosity (cps) | 1800 | 1675 | 1600 | |
| % Solids | 53.7 | 53.2 | 53.7 | |
| pH | 3.9 | 3.9 | 3.9 | |
| Grit (ppm) | Not run | 138 | Not run | |
| MFFT, °F | 69 | 67 | 58 | |
| T.I. | 0.43 | 0.45 | — | |
| I.V. | 0.89 | 0.86 | 0.65 | |

(Note: MFFT = minimum film-forming temperature)

EXAMPLE 2

Paint formulations are prepared with the latex paint polymers produced in Example 1 using the following procedures:

SEMI-GLOSS PAINT FORMULATIONS

This procedure describes the preparation of a pigment mix and latex semi-gloss paint with a PVC (pigment volume concentration) of 24.6% prepared from a 46% total solids latex.

PROCEDURE

Add in the order listed; disperse with a Cowles blade mixer until smooth:

| | Pounds | Gallons |
|---|---|---|
| Water | 92.40 | 11.10 |
| Natrosol | 1.19 | 0.10 | then add in order listed, mixing until smooth:

| | | |
|---|---|---|
| Troykyd 666 | 1.43 | 0.20 |
| Triton CF-10 | 2.67 | 0.30 |
| Tamol 731 | 8.10 | 0.90 |
| Triton GR-7 | 2.86 | 0.35 |
| di (phenylmercury) dodecenyl succinate | 0.24 | 0.70 |
| Glycocel DE | 13.81 | 1.70 |

Then add, mixing to a 6 grind:

| | | |
|---|---|---|
| TiO₂ (pigment grade) | 223.85 | 6.40 |
| Barium sulfate (pigment grade) | 69.06 | 1.96 |
| TOTAL | 415.61 | 23.08 |

Continue mixing until uniform, then let down in the following order:

| | | |
|---|---|---|
| Propylene glycol | 67.63 | 7.95 |
| Pine oil | 0.95 | 0.12 |
| Colloid 60 | 3.81 | 0.50 |
| Ethylene glycol | 26.67 | 2.95 |
| Latex, 46% total solids | 535.35 | 60.25 |
| Water, viscosity/adjustment | 42.87 | 5.15 |

-continued

| | | |
|---|---|---|
| TOTAL | 1092.39 | 100.00 |

| PAINT PROPERTIES | |
|---|---|
| Weight per gallons, pounds | 10.93 |
| PVC% | 24.61 |
| Nonvolatiles % | 49.39 |
| pH | 9.0 – 9.5 |
| Viscosity, K. U. | 68 – 72 |
| Leveling | Good |
| 60° Gloss, Units | 30 – 35 |

WHITE AND WHITE-TINT BASE EXTERIOR LATEX PAINT

| | Pounds | Gallons |
|---|---|---|
| Water | 110.0 | 13.20 |
| Natrosol 250 4HR | 1.3 | 0.13 |
| Propylene Glycol | 15.0 | 1.70 |
| Potassium tripolyphosphate | 1.0 | — |
| Colloid 111 | 4.0 | 0.40 |
| Igepal CA-630 | 2.5 | 0.30 |
| Potassium Carbonate | 1.0 | — |
| R-960 | 225.0 | 6.70 |
| Minex 4 | 165.0 | 7.30 |
| Texanol | 7.0 | 0.90 |
| Colloid 667 | 0.7 | 0.10 |
| Phenylmercuric acetate | 1.5 | 0.10 |

Add in the order listed, mix until uniform, and then add:

| | | |
|---|---|---|
| Emulsion (46%)* | 308.0 | 34.20 |
| Colloid 677 | 1.0 | 0.10 |
| Water and/or Natrosol Solution | 291.0 | 34.90 |
| NH₄OH | 1.0 | — |
| | 1135.0 | 100.03 |
| Weight/gal., lb. | 11.33 | |
| PVC % | 50 | |
| Solids Content % | 48.5 | |
| Viscosity, KU | 80–90 | |

*For 55% emulsion - 258 lbs. + 50 lbs. water and/or Natrosol solution.
For 50% emulsion - 283 lbs. + 25 lbs. water and/or Natrosol solution.

EXAMPLE 3

Paint formulations prepared in Example 2 are tested for weathering with the results given in Tables 2 and 3.

Table 2
ONE YEAR EXPOSURE AT 45° SOUTH SEMI-GLOSS SELF PRIMED WOOD

| SAMPLE | MILDEW | BLISTERING | CRACKING |
|---|---|---|---|
| Control | 6 | 7 | 8 |
| 1 | 7 | 9 | 10 |
| 2 | 6 | 10 | 10 |
| 3 | 6 | 10 | 10 |
| 4 | 6 | 10 | 10 |
| 5 | 7 | 7 | 10 |
| 6 | 6 | 7 | 10 |
| 7 | 7 | 6 | 10 |
| 8 | 7 | 7 | 10 |
| 9 | 7 | 8 | 10 |
| 10 | 6 | 8 | 10 |
| 11 | 7 | 5 | 10 |
| 12 | 8 | 8 | 10 |
| 13 | 7 | 8 | 10 |
| 14 | 6 | 10 | 10 |
| 15 | 6 | 10 | 8 |
| 100% Acrylic | 7 | 8 | 9 |
| 10 = NONE | | | 1 = FALL |

TABLE 3
NINE MONTHS EXPOSURE AT 45° SOUTH SEMI-GLOSS OVER CHALKED SURFACE

| SAMPLE | MILDEW | BLISTERING | CRACKING |
|---|---|---|---|
| Control | 5 | 8 | 8 |
| 1 | 6 | 10 | 9 |
| 2 | 6 | 10 | 10 |
| 3 | 7 | 8 | 10 |
| 4 | 7 | 9 | 10 |
| 5 | 6 | 9 | 10 |
| 6 | 6 | 9 | 10 |
| 7 | 7 | 8 | 6 |
| 8 | 6 | 4 | 10 |
| 9 | 7 | 9 | 10 |
| 10 | 7 | 9 | 10 |
| 11 | 7 | 9 | 10 |
| 12 | 7 | 8 | 10 |
| 13 | 7 | 9 | 9 |
| 14 | 7 | 10 | 10 |
| 15 | 5 | 10 | 10 |
| 100% Acrylic | 8 | 9 | 8 |
| 10 = NONE | | | 1 = FAIL |

A comparison of the results obtained indicates that the formulations containing the multifunctional acrylates (MFA) exhibited greater hardness, tensile strength and minimum film-forming temperatures, with less elongation and grit content than the control sample. However, comparable monomer conversion, thixotropic index, mechanical stability and viscosity are obtained for control and MFA samples.

EXAMPLE 4

The procedure of Example 1 is repeated using a higher monomer content (63%) with proportional increase in the amounts of surfactants, catalysts and activator using the following formulation:

Monomers: 630
Igepal CA-897: 31.5
Triton X-200: 3.15
Tertiary Butyl Hydroperoxide: 1.26
Sodium Persulfate: 0.05
Hydrozin: 0.82
Water: 333.22

Clear films made from the polymer products showed increased minimum film-forming temperature, tensile strength and hardness, with a decrease in grit content and elongation. The films also showed excellent resistance to water-spotting.

EXAMPLE 5

The procedure of Example 1, known as a pre-emulsion technique, is varied in that the surfactants solution is intially charged directly to the reaction flask prior to heating and the monomer blend is held for delayed addition. This variation is referred to as monomer blend technique.

The monomer blend technique slightly improved monomer conversions and generally increased viscosities of the product but decreased thixotropic index. Grit content, hardness, minimum film-forming temperatures and mechanical stability are not affected by the change in preparative procedure.

Identification of Commercial Products Used in Foregoing Examples

Texanol — 2,2,4-trimethylpentanediol monoisobutyrate (Eastman Chemical Company)
Igepal CA-897 and 630 — homologous nonylphenoxypoly (ethyleneoxy) ethanol; (Antara Chemicals).
Natrosol 110 LR and 250-4HR — Hydroxyethyl cellulose (Hercules, Inc.)

Hydrozin — Zinc formaldehyde sulfoxylate (Nopco Chemicals Co.)

Triton X-200, CF-10 and Gr-7 — Water-soluble surfactant based on alkaryl polyether alcohols, sulfonates and sulfates (Rohm and Haas Co.)

Minex 4 — filler pigment Silica—61/Lumina—30-/inert—9 (Indusmin Ltd., Toronto, Canada).

R-960 — Rutile $TiO_2$ (Dupont).

Colloid 111 and 667 — Colloids 111 = 25% anionic dispersant (Colloids Inc., Newark, N.J.) Colloids 667 = defoamer (Colloids Inc, Newark, N.J.)

Tamol 731 — 25% anionic dispersant (Rohm & Haas, Philadelphia, Pa.)

Troykyd 666 — defoamer (Troy Chemical Co., Newark, N.J.)

Glycocel DE — diethylene glycol monoethyl ether *Celanese We do not make it anymore. A substitute is CARBITOL made by Union Carbide.

What is claimed is:

1. A latex composition comprised of an emulsion polymer of vinyl acetate with from about 5% to about 50% by weight of alkyl acrylate or methacrylate based on the total weight of vinyl acetate and alkyl acrylate or methacrylate and from about 2% to about 10% by weight, based on the total weight of said polymer, of an acrylic or methacrylic acid ester of a polyol in which at least two hydroxyl groups are esterified.

2. A composition as in claim 1 wherein said polyol is trimethylolpropane.

3. A composition as in claim 1 wherein said polyol is hexanediol.

4. A composition as in claim 1 wherein said polyol is pentaerythritol.

5. A composition as in claim 1 wherein said polyol ester is hexanediol diacrylate.

6. A composition as in claim 1 wherein said polyol ester is trimethylolpropane triacrylate.

7. A composition as in claim 1 wherein said polyol ester is pentaerythritol triacrylate.

8. A latex coating composition comprising an emulsion polymer of vinyl acetate with from about 5% to about 50% by weight of alkyl acrylate or methacrylate based on the total weight of vinyl acetate and alkyl acrylate or methacrylate and from about 2% to about 10% by weight, based on the total weight of said polymer, of an acrylic or methacrylic acid ester of a polyol in which at least two hydroxyl groups are esterified.

9. A latex paint composition comprising an emulsion polymer of vinyl acetate with from about 5% to about 50% by weight of alkyl acrylate or methacrylate based on the total weight of vinyl acetate and alkyl acrylate or methacrylate and from about 2% to about 10% by weight, based on the total weight of said polymer, of an acrylic or methacrylic acid ester of a polyol in which at least two hydroxyl groups are esterified.

* * * * *